United States Patent
Lawson et al.

(10) Patent No.: US 10,445,265 B2
(45) Date of Patent: Oct. 15, 2019

(54) METHOD AND APPARATUS FOR DESKEWING DECENTRALIZED DATA STREAMS

(71) Applicant: CISCO TECHNOLOGY, INC., San Jose, CA (US)

(72) Inventors: Matthew Todd Lawson, Grass Valley, CA (US); Lewis Leo Butler, II, Belmont, CA (US); Rajashekar Reddy Bussa, Milpitas, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 15/788,899

(22) Filed: Oct. 20, 2017

(65) Prior Publication Data

US 2019/0121758 A1   Apr. 25, 2019

(51) Int. Cl.
*G06F 13/20* (2006.01)
*G06F 1/10* (2006.01)

(52) U.S. Cl.
CPC ............... *G06F 13/20* (2013.01); *G06F 1/10* (2013.01)

(58) Field of Classification Search
CPC ........... G06F 1/12; G06F 13/1689; G06F 1/10
USPC ........ 714/700, 744, 798, 731; 713/503, 400, 713/500, 401, 600; 375/354; 370/503, 370/516; 365/194, 233.1; 711/167; 327/161, 158, 141; 710/305, 61, 33
See application file for complete search history.

(56) References Cited

U.S. PATENT DOCUMENTS

| | | | |
|---|---|---|---|
| 6,167,077 A * | 12/2000 | Ducaroir | H04L 1/24 370/476 |
| 6,442,223 B1 * | 8/2002 | Dreps | H04L 7/0012 375/354 |
| 7,317,775 B1 * | 1/2008 | Erhart | H03L 7/0807 327/151 |
| 7,447,198 B1 * | 11/2008 | Banks | H04L 45/00 370/386 |
| 7,466,723 B2 | 12/2008 | Vakil et al. | |
| 7,500,131 B2 | 3/2009 | Panikkar et al. | |
| 9,058,266 B2 * | 6/2015 | Choi | G06F 11/0793 |
| 9,395,744 B2 * | 7/2016 | Benjamini | G06F 1/00 |
| 9,705,777 B2 | 7/2017 | Giannakopoulos et al. | |
| 2006/0156083 A1 * | 7/2006 | Jang | G06F 13/423 714/700 |
| 2008/0130814 A1 * | 6/2008 | Li | G06F 13/4217 375/372 |
| 2008/0279224 A1 * | 11/2008 | Pontius | H04L 25/14 370/503 |

(Continued)

*Primary Examiner* — Faisal M Zaman
(74) *Attorney, Agent, or Firm* — Cindy Kaplan

(57) ABSTRACT

In one embodiment, a method includes receiving an input signal at a local data lane comprising a dynamic entry shift register, the input signal comprising a marker also received at a remote data lane, identifying receipt of the marker in the local data lane, starting a timer and notifying the remote data lane that the marker was found, receiving a marker found status from the remote data lane and saving a value of the timer, calculating a compensated delay for the remote data lane based on the timer value and a number of pipeline stages for the remote data lane, and setting an entry point to the dynamic entry shift register based on the compensated delay to deskew data between the local data lane and the remote data lane.

20 Claims, 3 Drawing Sheets

(56) References Cited

U.S. PATENT DOCUMENTS

| | | | |
|---|---|---|---|
| 2009/0116839 A1* | 5/2009 | Kikuchi | H04J 14/02 398/79 |
| 2010/0074391 A1* | 3/2010 | Rose | G11C 19/00 377/70 |
| 2011/0182384 A1* | 7/2011 | Iwatsuki | H04L 7/08 375/316 |
| 2014/0013179 A1* | 1/2014 | Takaku | H04L 1/0045 714/748 |
| 2016/0118966 A1* | 4/2016 | Chowdhury | H03K 5/05 327/161 |
| 2016/0182154 A1* | 6/2016 | Fang | H04B 10/2575 398/116 |
| 2017/0090510 A1* | 3/2017 | Tennant | G06F 1/12 |
| 2018/0069732 A1* | 3/2018 | Sugawara | H04J 3/06 |
| 2018/0191523 A1* | 7/2018 | Shah | H04L 49/15 |

* cited by examiner

METHOD AND APPARATUS FOR DESKEWING DECENTRALIZED DATA STREAMS

TECHNICAL FIELD

The present disclosure relates generally to communications systems, and more particularly to deskewing data in communications systems.

BACKGROUND

As computing systems advance in technology, electronic devices increase in complexity. Interconnects used to couple and communicate between components are also increasing in complexity to meet bandwidth requirements, resulting in the need for greater coordination for data transfer and processing. A potential problem in coordination is skew, which refers to two or more signals that originally start out with a known timing relationship but lose the time reference with respect to each other. Communications systems employing multiple data lanes typically require a means of deskewing received information to restore the timing relationship.

BRIEF DESCRIPTION OF THE DRAWINGS

Corresponding reference characters indicate corresponding parts throughout the several views of the drawings.

DESCRIPTION OF EXAMPLE EMBODIMENTS

Overview

Figure 1:
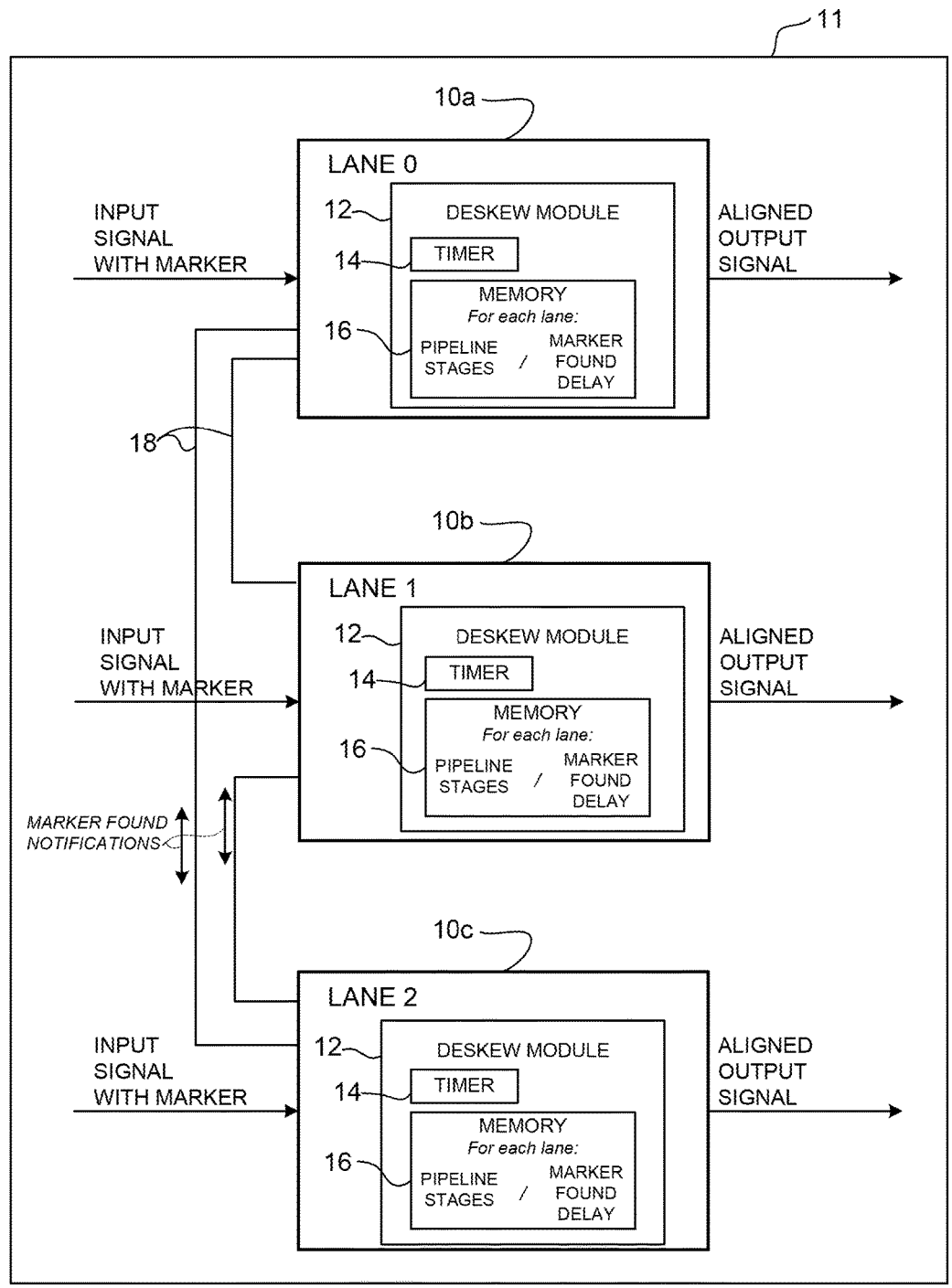
FIG. 1 illustrates a system for deskewing decentralized data streams, in accordance with one embodiment.

In one embodiment, a method generally comprises receiving an input signal at a local data lane comprising a dynamic entry shift register, the input signal comprising a marker also received at a remote data lane, identifying receipt of the marker at a deskew module in the local data lane and in response to identifying receipt of the marker, starting a timer at the local data lane and notifying the remote data lane that the marker was found, receiving at the deskew module, a marker found status from the remote data lane and saving a value of the timer when the marker found status was received, calculating at the deskew module, a compensated delay for the remote data lane based on the timer value and a number of pipeline stages associated with the remote data lane, and setting an entry point to the dynamic entry shift register based on a maximum compensated delay calculated for the remote data lane and any other remote data lanes to deskew data between the local data lane and the one or more remote data lanes.

In another embodiment, an apparatus generally comprises a plurality of data lanes configured to receive input signals comprising a marker, each of the data lanes comprising a dynamic entry shift register, a timer, and memory for storing a number of pipeline stages for each of the other data lanes, and a plurality of deskew modules, each of the deskew modules located at one of the data lanes and configured for identifying receipt of the marker at the data lane and in response to identifying receipt of the marker, starting the timer at the data lane and notifying the other data lanes that the marker was found, receiving a marker found status from each of the other data lanes and saving a value of the timer when the marker found status was received, calculating a compensated delay for each of the other data lanes based on the timer value and the number of pipeline stages for the data lane, and setting an entry point to the dynamic entry shift register based on a maximum compensated delay calculated for the other data lanes to deskew data between the data lanes.

In yet another embodiment, a method generally comprises receiving data at a die comprising a plurality of data lanes, each of the data lanes comprising a dynamic entry shift register and a deskew module, identifying receipt of a marker at each of the deskew modules, and in response to identifying receipt of the marker, starting a timer and notifying the other deskew modules that the marker was found, receiving at each of the deskew modules, a marker found status from the other deskew modules and saving a value of the timer when the marker found status is received, calculating at the deskew modules, a compensated delay for each of the data lanes based on the saved timer value and a number of pipeline stages associated with the data lane, and setting at each of the deskew modules, an entry point to the dynamic entry shift register based on a maximum compensated delay to deskew data between the data lanes. At least two of the data lanes are physically separated from one another on the die.

Further understanding of the features and advantages of the embodiments described herein may be realized by reference to the remaining portions of the specification and the attached drawings.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

Communications networks operating at high speed and capacity often send data within a system using multiple data lanes. Data skewing may occur when data is partitioned and sent across multiple lanes. Conventional methods for deskewing multiple lanes of data may require all of the lanes to be in close proximity to one another so that the presence of an alignment character in all lanes can be seen immediately and acted upon in the same clock cycle. While this may work for PCS (physical coding subsection) type applications and similar implementations in which the data lanes are located in the same section of a semiconductor chip, this does not work for data lanes that are not physically located near one another. For example, this may be particularly problematic with 2.5 dimensional (2.5D) packaging with chip-to-chip channels and HBM (High Bandwidth Memory) chip technology.

The embodiments described herein provide deskewing of decentralized data streams, which may be physically isolated or separated by distance. The embodiments may be used to deskew channelized data across any distance and may be used, for example, with large chip-to-chip input/output buses. In one or more embodiments, a dynamic entry point shift register is used along with delay pipelines and timers to deskew data across any number of lanes, regardless of the distance between the lanes. As described in detail below, pipelines, counters, and distributed autonomous logic are used to deskew decentralized data, which may be located, for example, across a die or across multiple die.

Referring now to the drawings, and first to FIG. 1, a diagram illustrating three remote data lanes (data links, data streams, circuits, shift registers, components) 10a, 10b, 10c is shown. Each data lane may be located in a separate region (section, portion) of a die 11 (i.e., physically separated, separated by more than a clock cycle) or on separate die of a semiconductor chip, for example. The physically separated data lanes are referred to herein as remote data lanes. The die 11 comprises a block of semiconductor material on which a circuit is formed. Two or more die may be assembled together and packaged to form a single integrated circuit. In one embodiment, the die 11 may be located on a multi-chip module comprising 2.5 Dimensional (2.5D) packaging with chip-to-chip interfaces or a HBM (High Bandwidth Memory) chip, for example. Chip-to-chip interface blocks may span the entire side of a die and the data may enter the die from any number of entry points. In one example, the embodiments may be implemented in next generation chip designs utilizing multi-chip modules or multi-dimensional (e.g., 2.5D) construction in which multiple die are connected to each other via a silicon interposer. Communications between the die may be accomplished, for example, via large buses. It is to be understood that the chip and die structures described herein are only examples and the embodiments described herein may be implemented in any other type or arrangement of die, chip, or interface without departing from the scope of the embodiments.

A data stream (data packets) may be transmitted through any number of data lanes. For example, as shown in FIG. 1, data may be received at three data lanes (Lane 0, Lane 1, Lane 2) and deskewed to form the data stream. In one embodiment, an alignment marker is inserted into an input signal (e.g., high speed data signal) for use in deskewing the data. The alignment marker may include any suitable number of bits or bytes that indicate when data is transmitted through the data lane. For example, an alignment marker may be inserted simultaneously into each data lane during transmission. A deskew module (circuit, logic, processor, processing elements) 12 detects the alignment marker in each data lane, which is used along with information received from remote data lanes to indicate the amount of latency or delay corresponding to the transmission of data, as described in detail below.

In the example shown in FIG. 1, three data lanes 10a, 10b, 10c each receive an input signal comprising an alignment marker and output an aligned signal based on processing performed in the deskew module 12. As described below with respect to FIG. 3, each lane 10a, 10b, 10c may comprise any number of storage elements and may be configured to produce an output signal based on the received input signal delayed through the storage elements using a shift register with a dynamic entry point. The deskew module 12 comprises autonomous logic operable to deskew data between remote data lanes 10a, 10b, 10c by defining an entry point to the shift register to permit deskewing of data that is physically isolated or separated by distance (e.g., located in separate regions or sections of a die or multiple die).

As shown in FIG. 1, the deskew module 12 comprises a timer 14 and memory 16 for storing a number of pipeline stages for each remote data lane and timer values representing a "marker found" delay for each remote data lane. Marker found status is communicated between remote data lanes via communication links (channel, interface, pipeline structure) 18. A number of pipeline stages for remote lanes may be programmed in memory 16 or shared between data lanes, for example. As described below, the pipeline structure information is used to add an identifiable amount of delay, which is a value that is known and predictable. This allows each lane of data to be located any distance from other lanes in a channel.

It is to be understood that the diagram shown in FIG. 1 is only an example and that the deskew embodiments described herein may be implemented with any number of data lanes in any arrangement or location on one or more die, without departing from the scope of the embodiments.

Figure 2:
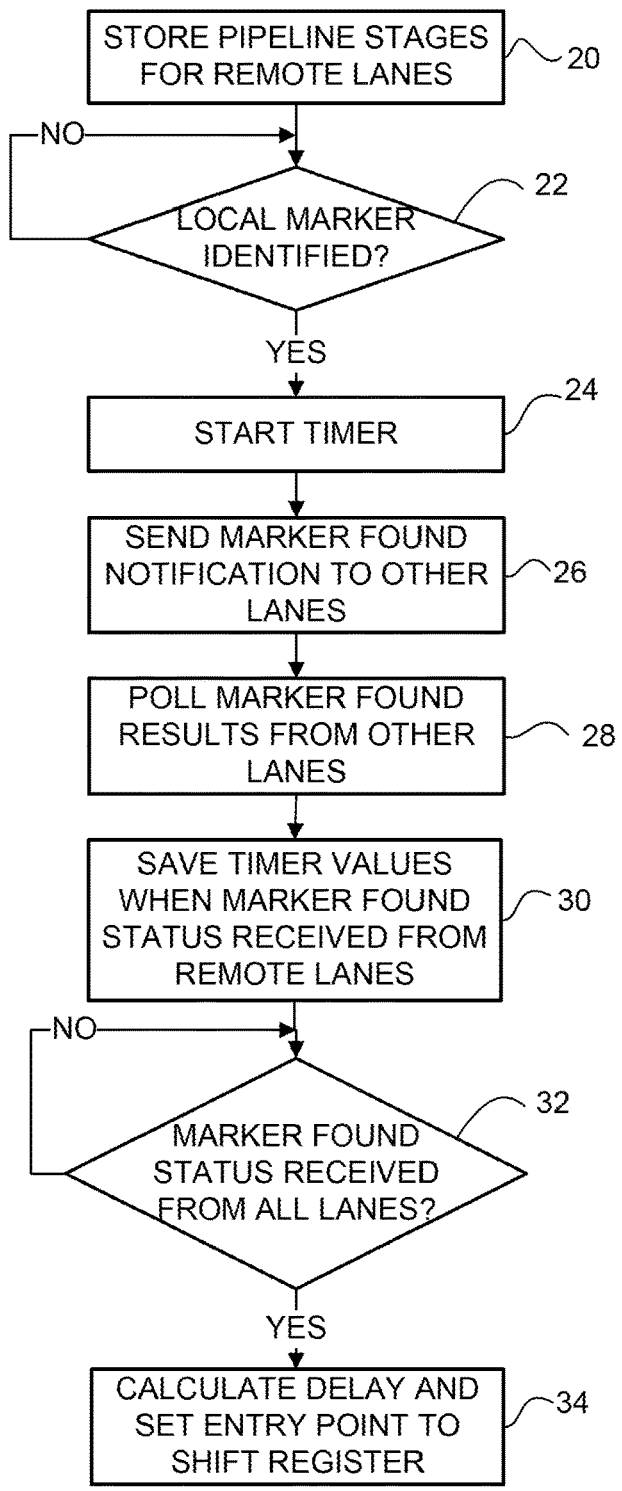
FIG. 2 is a flowchart illustrating an overview of a process for deskewing decentralized data streams, in accordance with one embodiment.

FIG. 2 is a flowchart illustrating a process for deskewing decentralized data streams, in accordance with one embodiment. At step 20, each data lane 10a, 10b, 10c stores the number of pipeline stages associated with remote data lanes (FIGS. 1 and 2). As previously noted, this information may be programmed in memory 16 or received from a remote lane. Upon receiving an input signal, each lane 10a, 10b, 10c looks for its own marker in the received input signal (step 22). When the marker is identified (e.g., at local lane 10a), the lane starts its local timer 14 (step 24). The local lane 10a also sends a "marker found" notification message via a pipeline structure (shown as link 18 in FIG. 1) to the remote lanes 10b, 10c (step 26).

After the timer (counter) is started, the local lane 10a polls the marker found pipelined results from all other lanes 10b, 10c (step 28) (FIGS. 1 and 2). As the lane marker found status is received from each remote lane 10b, 10c, the current value of the timer 14 at the local lane 10a is saved to a storage element (memory 16) (step 30). This value represents the marker found delay for the remote lane. Once all remote lanes 10b, 10c report the marker found status to the local lane 10a, the local timer 14 is stopped (step 32). At this point, the timer 14 has counted the number of clock cycles until all other lanes found the marker, knows the various pipeline delays, and is ready to calculate a deskew delay.

In one embodiment, the local lane 10a subtracts from each incoming marker found timer value, the number of pipeline stages for that lane 10b, 10c to identify a compensated delay, which cannot be less than 0. The local lane 10a then finds the maximum compensated delay out of all of the computed compensated delays, and uses it as the entry point into its local shift register (step 34). The maximum value represents the skew between the local lane 10a and the lane that received the marker last. If all compensated delays are 0, then the local lane was the last to receive the marker and the entry point is 0. This process is performed for each lane 10a, 10b, 10c. While the lanes all perform the search/calculate functions at generally the same time they will not all determine the deskew value at the same instance in time.

It is to be understood that the process shown in FIG. 2 and described above is only an example and that steps may modified, reordered, deleted, combined, or added, without departing from the scope of the embodiments.

As previously described, the calculated maximum delay may be used to set the entry point to a dynamic entry point shift register (also referred to herein as a dynamic entry shift register). In one embodiment, the dynamic entry point shift register is configured as described in U.S. Pat. No. 8,023,612, which is incorporated herein by reference in its entirety. The method used to deskew data in U.S. Pat. No. 8,023,612 requires all of the lanes to be in close proximity to one another so that the presence of an alignment character in all lanes can be seen immediately and acted upon in the same clock cycle. The embodiments described herein make it possible to deskew data across any number of lanes, regardless of the distance between the lanes of data.

Figure 3:
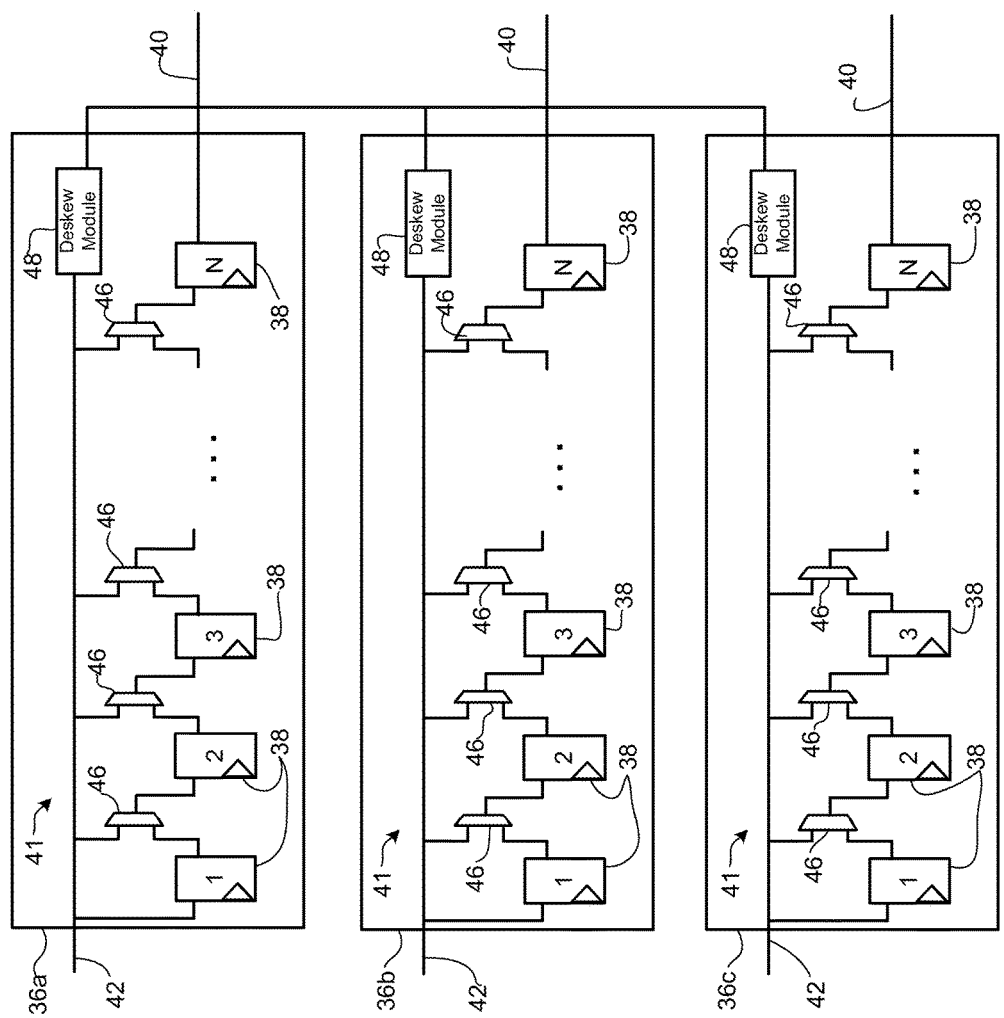
FIG. 3 illustrates dynamic entry point shift registers for use in the system of FIG. 1, in accordance with one embodiment.

FIG. 3 illustrates details of a dynamic entry shift register, generally indicated at 41, that may be used in the system of FIG. 1, in accordance with one or more embodiments. In the example shown in FIG. 3, the dynamic entry shift register for each data lane 36*a*, 36*b*, 36*c* comprises storage elements 38 (storage elements 1, 2, 3, . . . , N) and is configured to produce as output signal 40, the received input signal 42 delayed through up to N storage elements. The storage elements 38 may be implemented as flip flops, memory elements, storage arrays, registers, register arrays, or any other suitable elements. A signal sent through multiple storage elements will be delayed by multiple clock cycles.

Multiplexers 46 are interposed between storage elements 38 to allow a non-first storage element (e.g., storage elements 2 through N) to have as its input the original input signal 42 or the output of the immediate previous storage element.

Deskew module 48 is configured to control multiplexers 46 to induce the appropriate delay of a data signal applied to input signal 42 by channeling this signal through between one and N storage elements 38. The deskew module 48 may be implemented in circuitry, including one or more processing elements, for example. Once input signal 42 is directed to one of the storage elements 38 through one of the multiplexers 46, all subsequent multiplexers are configured to produce as its output the output value of the previous stage storage element. If the input signal 42 is to be delayed by N storage elements, then all multiplexers 46 are configured to produce as its output, the output value of the previous stage storage element. As previously described, the deskew computations performed at each lane 36*a*, 36*b*, 36*c* are used to identify the entry point to the shift register 41. The deskew module 48 controls the multiplexers 46 to induce an appropriate delay of the data signal applied to the input signal.

The following describes one example implementing the embodiments described herein using three data lanes 10*a*, 10*b*, 10*c* as shown in FIG. 1. In this example, lane 0 to 2 has 20 pipeline stages in both directions. Lane 0 to 1 has 10 pipeline stages in both directions. Lane 2 to 1 has 30 pipeline stages in both directions.

Local lane 0 finds the alignment marker at time 0 and starts a timer. Lane 0 "marker found" status is placed in the pipeline 18 to the other lanes (lane 1 and lane 2). Remote lane 1 finds the marker at time 2 and starts a timer. Lane 1 "marker found" is placed in the pipeline and transmitted to the other lanes (lane 0 and lane 2). Remote lane 2 finds the marker at time 5 and starts a timer. Lane 2 "marker found" is placed in the pipeline and transmitted to the other lanes (lane 0 and lane 1).

Local lane 0 receives "marker found" notifications from remote lane 1 and remote lane 2. Lane 0 is notified about lane 1 result at time 12 (lane 1 marker found at time 2+10 pipeline stages from lane 1). Lane 0 is notified about lane 2 result at time 25 (lane 2 marker found at time 5+20 pipeline stages from lane 2). Lane 0 subtracts 10 from the line 1 delay and the compensated delay is 2. Lane 0 subtracts 20 from the lane 2 delay and the compensated delay is 5. Lane 0 calculates the maximum delay as 5 and sets the entry point to the shift register at 5. Lane 0 data will be delayed by 5 clock cycles.

Local lane 1 receives "marker found" notifications from remote lane 0 and remote lane 2. Lane 1 is notified about lane 0 result at time 8 (−2+10 pipeline stages from lane 1). In this example, −2 is due to lane 0 marker found at time 0 and lane 1 local timer started at time 2. Lane 1 is notified about lane 2 result at time 33 ((5-2)+30 pipeline stages from lane 2). Lane 1 subtracts 10 from the lane 0 delay and the compensated delay is −2, which is normalized to 0. Lane 1 subtracts 30 from the lane 2 delay and the compensated delay is 3. Lane 1 calculates the maximum delay as 3 and sets the entry point to the shift register at 3. Lane 1 data will be delayed by 3 clock cycles.

Local lane 2 receives "marker found" notifications from remote lane 0 and remote lane 1. Lane 2 is notified about lane 0 result at time 15 (−5+20 pipeline stages from lane 0). Lane 2 is notified about lane 1 result at time 27 ((2-5)+30 pipeline stages from lane 1). Lane 2 subtracts 20 from the lane 0 delay and the compensated delay is −5, which is normalized to 0. Lane 2 subtracts 30 from the lane 1 delay and the compensated delay is −3, which is normalized to 0. Lane 2 calculates the maximum delay as 0 and sets the entry point to the shift register at 0. Lane 2 data is not delayed since it was the last lane to receive the marker. All lanes write incoming data to their local entry point and the data leaving the shift register in all lanes is aligned.

In one or more embodiments, error detection may be accomplished by comparing the timer value to the known pipeline delay+maximum depth of the shift register. If the timer exceeds the sum of the pipeline delay+the shift register depth, the deskew process has failed and may be started over.

The embodiments described herein may operate in the context of a data communications network including multiple network devices. The network may include any number of network devices in communication via any number of nodes (e.g., routers, switches, gateways, controllers, edge devices, access devices, aggregation devices, core nodes, intermediate nodes, or other network devices), which facilitate passage of data within the network. The embodiments may be implemented in a network device comprising a programmable machine that may be implemented in hardware, software, or any combination thereof. The network device includes one or more processor, memory, and network interface. The network device may comprise any number of chips (e.g., ASIC (Application-Specific Integrated Circuit)), one or more operating in accordance with the embodiments described herein.

As can be observed from the foregoing, one or more embodiments may provide many advantages over conventional systems. For example, one or more embodiments may provide flexibility in chip design by accounting for timing issues caused by large distance signal propagation delay. Also, a design cycle may be reduced due to a simplified logic and timing closure.

Although an apparatus and method has been described in accordance with the embodiments shown, one of ordinary skill in the art will readily recognize that there could be variations made without departing from the scope of the embodiments. Accordingly, it is intended that all matter contained in the above description and shown in the accompanying drawings shall be interpreted as illustrative and not in a limiting sense.

What is claimed is:

1. A method comprising:
storing a number of pipeline stages associated with a remote data lane at a local data lane;
receiving an input signal at the local data lane comprising a dynamic entry shift register, the input signal comprising a marker also received at the remote data lane;
identifying receipt of the marker at a deskew module in the local data lane and in response to identifying receipt of the marker, starting a timer at the local data lane and notifying the remote data lane and all other remote data lanes receiving the input signal that the marker was found via a pipeline structure;
receiving at the deskew module, a marker found status from the remote data lane at a communication link;
storing at the deskew module a value of the timer when the marker found status was received, wherein the value of the timer represents a marker found delay for the remote data lane;
calculating at the deskew module, a compensated delay for the remote data lane based on the timer value and the number of pipeline stages associated with the remote data lane; and
setting an entry point to the dynamic entry shift register based on a maximum compensated delay calculated for the remote data lane and any other remote data lanes to deskew data between the local data lane and the one or more remote data lanes, wherein the local data lane and the one or more remote data lanes are physically isolated or separated by distance.

2. The method of claim 1 wherein the maximum compensated delay represents a data skew between the local data lane and the remote data lane of all of the remote data lanes receiving the marker last.

3. The method of claim 1 wherein the remote data lane comprises the dynamic entry shift register and the deskew module, and is configured to calculate the compensated delay for all of its respective remote data lanes and set the entry point to the dynamic entry shift register.

4. The method of claim 1 wherein the local data lane is located on a separate die of a semiconductor chip.

5. The method of claim 1 wherein the local data lane and the remote data lane are located in different sections of a semiconductor chip die.

6. The method of claim 5 wherein the semiconductor chip comprises a 2.5 dimensional chip and the communication link comprises a chip-to-chip interface.

7. The method of claim 1 further comprising storing a pipeline delay for the remote data lane based on the number of pipeline stages associated with the remote data lane.

8. The method of claim 7 further comprising comparing the timer value to the pipeline delay plus a maximum depth of the dynamic entry shift register and detecting an error if the timer value is greater than the sum of the pipeline delay and the maximum depth of the dynamic entry shift register.

9. The method of claim 1 wherein calculating the compensated delay for the remote data lane comprises subtracting the number of pipeline stages from the timer value for the remote data lane.

10. The method of claim 9 wherein the compensated delay is negative and further comprising normalizing the compensated delay to zero.

11. An apparatus comprising:
a plurality of data lanes configured to receive input signals comprising a marker, each of the data lanes comprising a dynamic entry shift register, a timer, and memory for storing a number of pipeline stages for each of the other data lanes;
a plurality of deskew modules, each of the deskew modules located at one of the data lanes and configured for identifying receipt of the marker at the data lane and in response to identifying receipt of the marker, starting the timer at the data lane and notifying all of the other data lanes that the marker was found via a pipeline structure, receiving a marker found status from each of the other data lanes and saving a value of the timer when the marker found status was received, calculating a compensated delay for each of the other data lanes based on the timer value and the number of pipeline stages for the data lane, and setting an entry point to the dynamic entry shift register based on a maximum compensated delay calculated for the other data lanes to deskew data between the data lanes; and
memory for storing a number of pipeline stages associated with the data lanes and a value of the time when the marker found status was received, wherein the value of the time represents a marker found delay for the remote data lane;
wherein at least two of the data lanes are physically isolated or separated by distance.

12. The apparatus of claim 11 wherein the plurality of data lanes are located in different regions of a semiconductor chip die.

13. The apparatus of claim 11 wherein at least two of the data lanes are located on different die of a semiconductor chip and notification that the marker was found is transmitted via a chip-to-chip interface.

14. The apparatus of claim 11 wherein the notification that the marker was found is transmitted via a pipeline structure.

15. The apparatus of claim 11 wherein the number of pipeline stages defines a pipeline delay between two of the data lanes.

16. The apparatus of claim 15 wherein the deskew module is further operable to compare the timer value to the pipeline delay plus a maximum depth of the dynamic entry shift register and detect an error if the timer value is greater than the sum of the pipeline delay and the maximum depth of the dynamic entry shift register.

17. The apparatus of claim 11 wherein calculating the compensated delay for one of the other data lanes comprises subtracting the number of pipeline stages from the timer value for the data lane.

18. A method comprising:
receiving data at a die comprising a plurality of data lanes, each of said plurality of data lanes comprising a dynamic entry shift register and a deskew module;
identifying receipt of a marker at each of the deskew modules, and in response to identifying receipt of the marker, starting a timer and notifying the other deskew modules that the marker was found;
receiving at each of the deskew modules, a marker found status from the other deskew modules and saving a value of the timer when the marker found status is received;
calculating at the deskew modules, a compensated delay for each of the data lanes based on the saved timer value and a number of pipeline stages associated with the data lane, wherein calculating said compensated delay for a local lane comprises subtracting the number of pipeline stages for the local lane from each of said incoming marker found timer values and identifying a maximum compensated delay; and setting at the deskew modules, an entry point to each of the dynamic entry shift registers based on said maximum compensated delay to deskew data between the data lanes, said maximum compensated delay representing a skew between the local lane and a lane that received the marker last;

wherein at least two of the data lanes are physically separated from one another on the die.

19. The method of claim 18 wherein receiving data at a die comprises receiving data at remote portions of a die.

20. The method of claim 18 wherein receiving data at a die comprises receiving data at two die comprising the data lanes on a chip-to-chip interface.

* * * * *